Patented Aug. 8, 1939

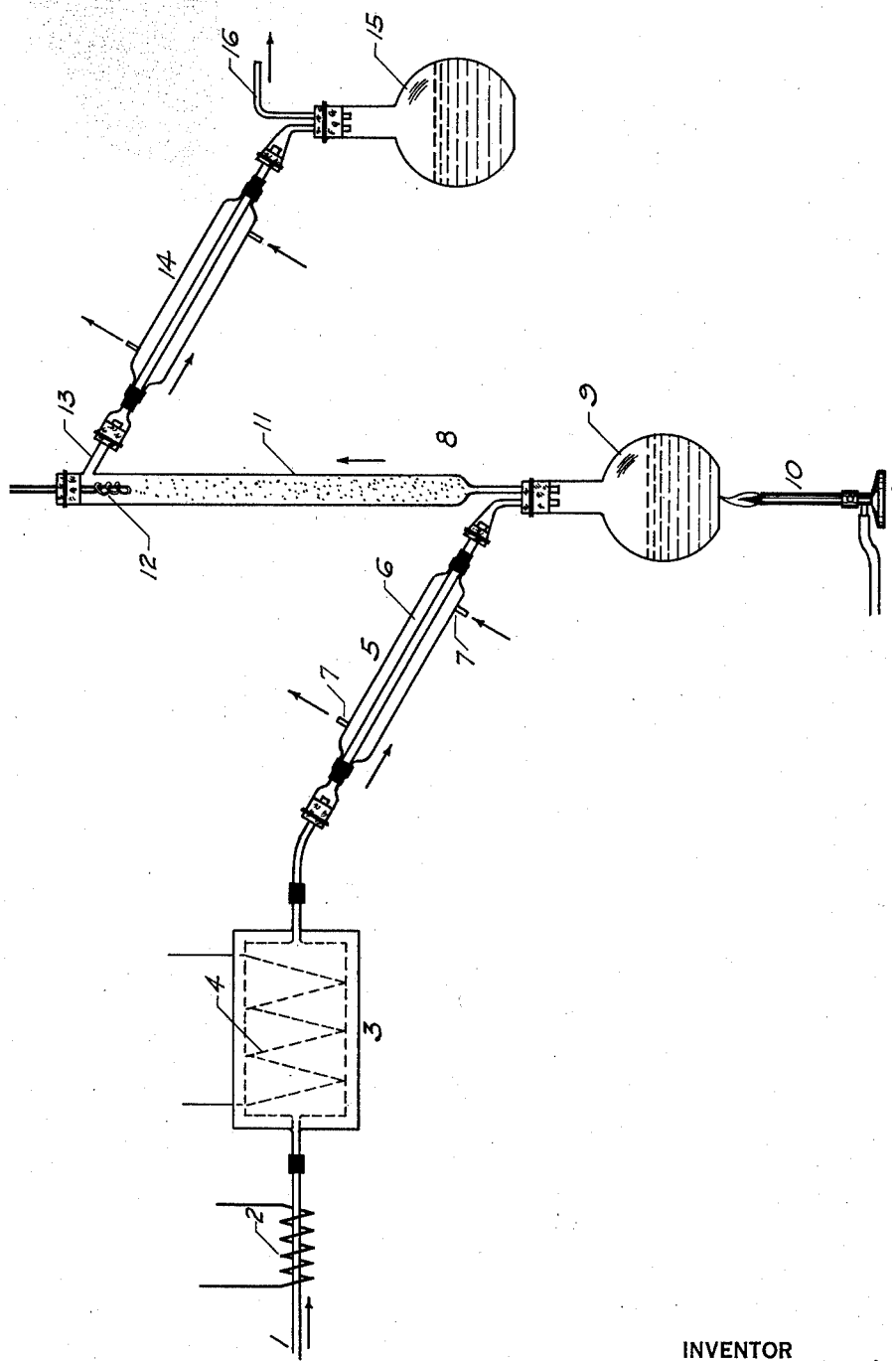

2,168,590

UNITED STATES PATENT OFFICE 2,168,590

CATALYTIC ALKYLATION OF AROMATIC HYDROCARBONS

Hugh S. Taylor, Princeton, N. J., assignor to The M. W. Kellogg Co., New York, N. Y., a corporation of Delaware Application December 7, 1935, Serial No. 53,298

9 Claims. (Cl. 260—671)

This invention relates to catalytic processes of chemical synthesis and more particularly to processes involving the alkylation of organic compounds. More specifically, the invention relates to the production of valuable compounds by the direct reaction between less valuable materials composed preponderantly of the constituents of the desired compound under the influence of a suitable catalyst and under milder conditions than those employed in the prior art.

In the synthesis of many organic compounds the reactions involved are often of a very complex nature and the production of the desired product is achieved only by a multiple step-wise procedure usually involving the formation of numerous intermediate products and very often the formation of undesirable byproducts of little value resulting not only in a high manufacturing cost but also in a relatively low yield of the desired product. Moreover the operating conditions are sometimes of a drastic nature, often necessitating high temperatures, unusual pressures, or other features requiring costly equipment which may be subject to rapid deterioration due to one or more of the steps in the manufacturing procedure. As a result of these and other considerations it is a not unusual situation that the high cost of certain products precludes their general use for purposes for which they are eminently suited and where their employment, if not barred by the element of excessive cost, would be of great benefit to those so employing them.

The present invention has for one of its objects the provision of a simple and economic process for producing many desirable organic compounds which involves a minimum of procedural steps, employing relatively simple and inexpensive equipment, and requiring operating conditions considerably less drastic than those ordinarily necessary.

In the operation of my invention I accomplish the direct alkylation of many organic compounds, or in certain cases inorganic compounds, in a single step under unusually mild operating conditions with a relatively high yield of the desired product and with a minimum production of byproducts of lesser value. By the term alkylation is meant the substitution of radicals or alkyl groups for one or more of the hydrogen atoms or other atoms or radicals of a molecule, or it may mean the addition of such groups at the double bond or bonds, or triple bond or bonds, of a molecule, where such bond or bonds occur, without the displacement of any of the original components of the molecule.

To cause the desired reaction to proceed I choose a catalyst and operating condition such that I secure the activation of specific bonds in the reacting materials, the bonds being those which will, when activated, result in the desired reaction. This specificity of a catalytic surface will be made clear by the following very simple example made possible by the use of deuterium ("heavy hydrogen") whereby it is possible to note the exchange of hydrogen atoms in a molecule or, in effect, to label the atoms, a procedure obviously impossible before the discovery and isolation of this material. When ethane and deuterium were passed together over a given nickel catalyst at a temperature of 135° C. there occurred a replacement of hydrogen atoms in the ethane molecule by deuterium atoms, the replacement being substantially complete after an hour, the products being "heavy ethane" and hydrogen. This interchange of atoms would of course be undiscernible except for the use of deuterium. When hydrogen and ethane are similarly passed over the catalyst at this temperature the products are identical with the feed and there appears to have been no reaction, whereas in actuality there may have been a large scale interchange of atoms of hydrogen between the original ethane and the hydrogen. By the use of deuterium however, it is now possible to state definitely that such interchange has occurred thus showing positively the activation of the C—H bonds in the ethane. When, however, ethane and hydrogen were passed over the same catalyst at a temperature of 200° C. the dissociation of ethane occurred by the breakage of a C—C bond, resulting in the production of methane, thus,

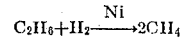

This reaction was substantially complete, i. e., total conversion of $C_2H_6$ to $CH_4$, after about an hour. The reaction producing methane was first detectable at about 150° C. Thus it is quite evident that, with an active nickel catalyst, whereas at 135° C. the C—H bonds of ethane are activated, at 200° C. the C—C bonds are in addition activated, thus illustrating the specificity of the activation of the bonds by the catalyst. It appears almost needless to note that neither of these reactions can be detected at the temperatures used in the absence of the catalyst.

Other examples of the activation of certain bonds as detected by the use of deuterium are the replacement of H atoms in benzene by deuterium at 200° C. over nickel, and over chromium oxide gel at somewhat higher temperatures and similarly the replacement of hydrogen atoms in $CH_4$ and $NH_3$ under conditions under which it was supposed that these materials were quite inert.

Having selected the catalyst and the operating conditions favorable to the activation of the desired bonds in the reactants involved it is now only necessary to contact the materials with the catalyst under the selected operating conditions and, after allowing the necessary reaction time to elapse, to withdraw the products, cooling, condensing, and otherwise handling these products as may be appropriate.

In order to make more clear the operation of my invention I will describe by way of illustration, but not of limitation, a specific embodiment of my invention whereby benzene and ethane are reacted to produce toluene according to the equation:

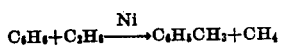
$$C_6H_6 + C_2H_6 \xrightarrow{Ni} C_6H_5CH_3 + CH_4$$

It will be observed that this reaction involves the alkylation of benzene by the substitution of a methyl group ($CH_3$) for one of the hydrogen atoms of the benzene, methane being produced as a byproduct in addition to toluene, the amount of this byproduct, however, being less than 15% by weight.

In the discussion of the specificity of catalytic surfaces, it was pointed out that at for example 200° C. active nickel activates C—C bonds of ethane and C—H bonds of benzene. It is readily seen that this catalyst and temperature may be employed to carry out this reaction. The process may be carried out at atmospheric pressure, subatmospheric, or superatmospheric pressure. For convenience and simplicity I prefer now to operate at substantially atmospheric pressure.

Referring now to the drawing, the single figure of which represents a form of apparatus suitable for carrying out the invention, a mixture of benzene and ethane is introduced at pipe 1 from a suitable container or compressor (not shown) and passes through a heating zone 2, diagrammatically shown. The heated mixture then passes into the insulated catalytic chamber 3 which contains the catalyst mounted preferably in pellet form on any suitable material as, for example, pumice or kieselguhr. The temperature of the catalyst chamber 3 may be maintained and controlled by means of the temperature regulating coil 4. The temperature and pressure at appropriate points in the apparatus may be determined by suitable instruments (not shown) installed wherever desired. The reacted product passes from the catalyst chamber through the cooler and condenser 5, furnished with a cooling medium jacket 6 having cooling medium entrance and exit 7. The greater portion of the condensible portion of the material passing through the condenser 5 is liquefied therein and the condensed material and uncondensed vapor and gas pass together into the fractionating equipment shown generally at 8. This equipment consists of condensate accumulator 9 which may be heated for reboiling by burner 10. Accumulator 9 may be provided with means (not shown) for periodically or continuously withdrawing condensate. Fractionating column 11 of any suitable design fractionates the vapor passing upwardly through it in the usual manner and may be furnished with reflux condensing coil 12 at its upper end and vapor outlet 13. The vapor passing through the outlet 13 passes to the condenser 14, similar to condenser 5. Condensate and uncondensible gases pass from the condenser 14 to the receiver 15 in which the condensate is accumulated, uncondensed gases passing out through tube 16 to an appropriate gas handling arrangement (not shown). The receiver 15 may be furnished with means (not shown) for withdrawing condensate as desired.

The raw materials, benzene and ethane, may be fed to the apparatus in any desired proportion, as for example in about equal molecular proportions or an excess of benzene may be used to insure the substantially complete conversion of the ethane, or, if desired, an excess of ethane may be used. Thus I may so proportion the feed that it contains two mols of benzene for each mol of ethane. The feed thus introduced is heated on its passage to the catalyst chamber to the desired degree, preferably in the neighborhood of 200° C. As noted hereinbefore the specificity of the particular catalyst cited, i. e., an active nickel, for the activation of the C—C bond of ethane was first noticeable at a temperature of about 150° C., therefore that temperature is the lowest at which the process is operable with such a catalyst. Also the process may be carried out at a temperature as high as 300° C. or higher but as already stated the preferred temperature is in the neighborhood of 200° C. It is to be understood that it is possible to carry out this reaction with different catalysts, those in the group classed as hydrogenation-dehydrogenation catalysts being generally suitable. None of these catalysts necessarily exhibits the same degree of catalytic effect at a given temperature as any other and for this reason different temperatures and rates of conversion would be used with a different catalyst. The specific operating conditions cited for the particular example described apply only for the catalyst cited and are not to be regarded as limiting conditions.

The free space within the catalyst chamber 3 is such that, for the given rate of feet, the reacting materials are maintained in contact with the catalyst for a period of time sufficient to allow the reaction to go forward to the desired extent. Under the conditions hereinbefore noted a reaction time of one hour, more or less, is satisfactory although, depending on conditions, a reaction time of two to five seconds or more may be sufficient while under other conditions a reaction of three hours or longer are desirable.

The material effluent from the catalyst chamber passing to the condenser 5 is composed of the desired product toluene and the byproduct methane in substantially equal molecular proportions along with any unconverted benzene and ethane. The liquefiable portions of this mixture, that is to say, the toluene and benzene, are largely condensed in condenser 5 although it is not essential that such liquefaction be entirely complete. The function of the fractionating apparatus 8 is to accomplish the separation of the product toluene from the more volatile benzene which has escaped conversion, as well as from any dissolved gaseous ethane and methane. The operation of such apparatus is well known and in this case toluene is recovered as a condensate in receiver 9 while the benzene and fixed gases pass overhead in vapor form through the outlet 13 to the condenser 14 where the benzene vapor is substantially completely liquefied, the liquid benzene being collected in the receiver 15. The uncondensed material comprising the byproduct methane and any unconverted ethane are conducted away from the system by means of the tube 16 for such subsequent treatment as may be desired. The benzene collected in receiver 15 may be reintroduced into the feed to the apparatus following the customary procedure of recycling unreacted portions of a feed stock. As already noted it is preferable in this process so to proportion the feed that an excess of benzene is present in order to further the substantially complete conversion of the ethane since the recovery of unconverted ethane substantially free of methane is accomplished with difficulty. Depending on the thoroughness of the fractionation in this apparatus, the toluene may be recovered from receiver 9 as a substantially pure product or it may require subsequent purification by any suitable process.

As to the mechanism by which reactions of this type proceed, theoretical considerations and intensive study of catalytic phenomena in general carried on over a considerable period of years lead me to believe at present that the reactions follow the course briefly outlined below. For the purpose of clarity the discussion will be confined, at the start at least, to the specific reactions of benzene and ethane. As already described, I have found that where ethane and hydrogen are passed over an active nickel at about 200° C., complete decomposition of the ethane to methane occurs. I believe that the ethane is chemically adsorbed on the surface of the catalyst in an activated condition in which the C—C bond is specifically activated. That is to say, when the ethane molecule

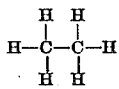

contacts the catalyst, the C—C bond is broken and the material is adsorbed on the surface as two methyl (CH₃) radicals, thus:

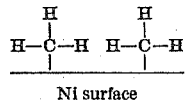

It may be considered that a methyl nickel complex is formed. Similarly hydrogen (H₂) on contacting the nickel surface is adsorbed in an activated state as two atoms of hydrogen. When ethane and hydrogen in mixture are thus adsorbed, we may picture the adjacent adsorbed fragments thus:

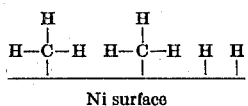

Under the conditions imposed there is a continual interaction between adjacent adsorbed radicals; thus it becomes apparent that adjacent CH₃ and H groups may readily unite to form relatively stable methane (CH₄) molecules which would thus appear as a product. It is also apparent that interaction between adjacent CH₃ groups may occur, but this merely regenerates C₂H₆ and interaction between adjacent activated H atoms merely regenerates H₂.

With regard to the activated adsorption of benzene on the same catalyst under like conditions, it has already been pointed out that in this case it is the C—H bonds of the benzene molecule that are activated, as shown by the experiments with deuterium. This type of activated adsorption may be pictured thus. The benzene molecule,

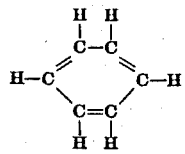

on contacting the nickel suffers a rupture of a C—H bond whereby a C₆H₅ radical and an H atom are adsorbed on the catalytic surface:

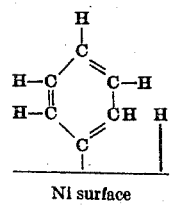

This type of adsorption is demonstrated by the fact that when deuterium is present, deuterium is found to be substituted for H in the molecule.

This rather detailed discussion is included by way of substantiating my theory as to the mechanism of the ethane-benzene reaction. In the light of the above it becomes rather simple to account for the production of toluene and methane from benzene and ethane under the influence of the catalyst. The ethane is adsorbed in an activated condition as CH₃ radicals and the benzene is adsorbed as C₆H₅ radicals and H atoms. Thus adjacent CH₃ and C₆H₅ groups will occur with a frequency dependent on the relative concentrations of the two materials on the surface, and reactions therebetween are to be expected, forming the toluene molecule:

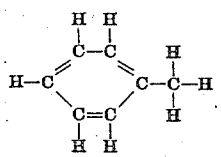

Also H and CH₃ groups have the opportunity to react to form methane and free energy calculations indicate that the joint occurrence of these two reactions is favored. The formation of diphenyl by the interaction of two adjacent C₆H₅ groups with simultaneous formation of H₂ is not favored by the free energy relationships involved, nor is the formation of ethyl benzene, and the presence of these products has not been noted in the end products of the reaction. Interaction between adjacent CH₃ groups will, of course, merely regenerate ethane and interaction between adjacent C₆H₅ and H groups results in the regeneration of benzene.

This reaction as above described is illustrative of the type of reaction broadly included within the scope of my invention and is characterized by the activation of specific bonds at catalytic surfaces and the reaction between the thus activated residues derived from distinct compounds to form specific desired products. The reaction detailed above is one wherein a C—H bond in one of the reactants is activated and a C—C bond in the other is activated and the residues thus activated interact to produce the desired product. Depending on the materials used, the catalyst, and conditions employed, any specific type of bond in one material may be activated and another specific bond in the other may be activated, that is to say, the bonds involved may be C—C, C—H, C—N, C—O, O—H, N—H, etc. In the case of the double C=C bond and the triple C≡C bond the situation is modified in that complete rupture may not occur but the bond may be activated as shown below for double bond:

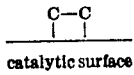

so that a product is formed by the addition of an activated residue at each of the free bonds, i. e., those bound to the catalyst.

It is of course to be understood that products cannot be formed indiscriminately without regard to the free energy relationships involved and that it is necessary that the free energy of the products must be so related to that of the reacting materials that the production of the desired product is favored. Because of these free energy relationships, the temperature required for purely thermal activation of the reacting materials is, in a great many cases, of such magnitude that the free energy change of the desired reactions is unfavorable, whereas it is possible to carry on such reactions utilizing the specific activation by the catalytic surface at a lower temperature, where the free energy change of the reaction favors its completion. Thus it is clear that the specific activating properties of the catalyst make possible the carrying out of many desirable reactions, which could not otherwise be conducted at any temperature in the absence of the catalyst, whereby the usual conception of the action of a catalyst in merely lowering the reaction temperature is modified to include making possible reactions which could not otherwise be made to proceed.

Below are listed a number of typical reactions which may be caused to proceed in accordance with my invention. It is to be understood that these examples are cited merely by way of illustration and are not to be considered as limiting the scope of my invention.

Reactions between saturated hydrocarbons:

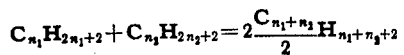

Reactions between paraffins as shown above by these general equations may be caused to proceed under proper conditions in the presence of a suitable catalyst as described. Obviously combinations of these reactions may occur when conditions favor each of them. These reactions illustrate generally the type of reactions possible between aliphatic hydrocarbons of which, of course, there are numerous variations possible, as for example, when unsaturated hydrocarbons are used.

Reactions between aromatics and saturated aliphatics are exemplified below:

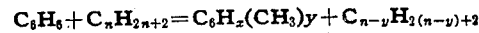

where $x+y=6$ and $n>y$

For example:

Here again numerous variations and combinations are possible some of which result in the formation of multi-ring compounds and may be exemplified by the general reaction:

$$nC_6H_5R' + mC_6H_5R'' = (C_6H_5)_{n+m} + R'_nR''_m$$

Reactions between paraffins and ammonia to form amines and $H_2$ are not favored thermodynamically but those forming amines and a paraffin hydrocarbon are favored and may be generally shown thus:

$$RR_1 + NH_3 = RNH_2 + RH$$

Those between ammonia and olefines can be carried out successfully, particularly when the number of carbon atoms in the hydrocarbon is relatively small. The general reaction may be expressed as below:

$$C_nH_{2n} + NH_3 = C_nH_{2n+1}NH_2$$

Similarly OH groups, $NH_2$, CO, CHO, halide, nitrogen, and sulphur groups and the like may be substituted in various hydrocarbons, their derivatives, and other organic compounds.

In general the catalysts employed in the operation of my invention are those generally classed as hydrogenating-dehydrogenating catalysts of which a great many are known such as for example, nickel, palladium, platinum, copper, iron, oxides of nickel, chromium, copper, zinc, and many other metals, their oxides, sulphides and other compounds thereof and mixtures of the same. It must not be inferred from this that the action of these various materials is identical and that any one of them may be used for any reaction. The extent to which they catalyze the various reactions differs markedly from one material to another and their specificity in the activation of certain bonds is also different. However, by selecting that catalyst which is found to activate the desired bonds under the proper conditions, these reactions may be caused to proceed in the direction of the desired products.

I claim:

1. The process of alkylating aromatic hydrocarbon compounds by paraffinic hydrocarbon compounds which comprises activating a bond external to the aromatic ring of an aromatic hydrocarbon compound by subjecting it to the action of a hydrogenating-dehydrogenating catalyst having specificity properties for said external bond, under such conditions of temperature and pressure that said catalyst specifically activates said external bond, simultaneously activating a carbon to carbon bond of a paraffinic hydrocarbon compound by the action of said catalyst in the presence of said activated aromatic hydrocarbon compound to form activated residues of said paraffinic hydrocarbon compound whereby said activated residues react with and alkylate said activated aromatic hydrocarbon compound.

2. The process of alkylating aromatic hydrocarbon compounds by paraffinic hydrocarbon compounds which comprises activating a bond external to the aromatic ring of an aromatic hydrocarbon compound by subjecting it to the action of a hydrogenating-dehydrogenating catalyst having specificity properties for said external bond, under such conditions of temperature and pressure that said catalyst specifically activates said external bond, simultaneously activating a bond of a paraffinic hydrocarbon compound by the action of said catalyst in the presence of said activated aromatic hydrocarbon compound to form activated residues of said paraffinic hydrocarbon compound whereby said activated residues react with and alkylate said activated aromatic hydrocarbon compound.

3. The process of alkylating aromatic hydrocarbon compounds by paraffinic hydrocarbon compounds which comprises activating bonds external to the aromatic ring of an aromatic hydrocarbon compound by subjecting it to the action of a hydrogenating-dehydrogenating catalyst having specificity properties for said external bond, under such conditions of temperature and pressure that said catalyst specifically activates said external bonds, simultaneously activating a carbon to carbon bond of a paraffinic hydrocarbon compound by the action of said catalyst in the presence of said activated aromatic hydrocarbon compound to form activated residues of said paraffinic hydrocarbon compound whereby said activated residues react with and alkylate said activated aromatic hydrocarbon compound.

4. The process of methylating aromatic hydrocarbon compounds which comprises subjecting ethane to the action of a hydrogenating-dehydrogenating catalyst under conditions such that said catalyst having specificity properties for the carbon to carbon bond of ethane, specifically activates the carbon to carbon bond of the ethane to form activated methyl groups, simultaneously subjecting an aromatic hydrocarbon compound to the action of said catalyst in the presence of the ethane, said catalyst and said conditions being also such that said catalyst specifically activates a bond external to the aromatic ring of said aromatic hydrocarbon compound, whereby said activated methyl groups react with and methylate said activated aromatic hydrocarbon compound.

5. The process of synthesizing alkylated benzenes which comprises subjecting benzene and saturated paraffin hydrocarbon of the general formula $C_nH_{2n+2}$, where $n$ is 2 or greater, to the action of a hydrogenating-dehydrogenating catalyst at a temperature and for an interval of time sufficient to produce a substantial yield of alkylated benzene.

6. The process of synthesizing toluene from benzene and ethane which comprises subjecting ethane to the action of a hydrogenating-dehydrogenating catalyst having specificity properties for the carbon to carbon bond of ethane, under conditions of temperature and pressure such that said catalyst specifically activates the carbon to carbon bond of the ethane to form activated methyl groups, simultaneously subjecting benzene to the action of said catalyst in the presence of the ethane, said catalyst and said conditions being also such that said catalyst specifically activates a bond external to the aromatic ring of said benzene, whereby said activated methyl groups react with and methylate said activated benzene to form toluene.

7. The process of synthesizing toluene from benzene and ethane which comprises subjecting ethane to the action of a hydrogenating-dehydrogenating catalyst having specificity properties for the carbon to carbon bond of ethane under conditions of temperature and pressure such that said catalyst specifically activates the carbon to carbon bond of the ethane to form activated methyl groups, simultaneously subjecting benzene to the action of said catalyst in the presence of the ethane, said catalyst and said conditions being also such that said catalyst specifically activates an external bond of said benzene, whereby said activated methyl groups react with and methylate said activated benzene to form toluene.

8. The process of synthesizing toluene from benzene and ethane which comprises subjecting ethane to the action of an active nickel catalyst under conditions such that said catalyst specifically activates the carbon to carbon bond of the ethane to form activated methyl groups, simultaneously subjecting benzene to the action of said catalyst in the presence of the ethane, said catalyst and said conditions being also such that said catalyst specifically activates an external bond of said benzene, whereby said activated methyl groups react with and methylate said activated benzene to form toluene.

9. The process of synthesizing toluene from benzene and ethane which comprises subjecting benzene and ethane to the action of an active nickel catalyst at a temperature ranging from 150° C. to 300° C. for a time interval sufficient to produce a substantial yield of toluene.

HUGH S. TAYLOR.